United States Patent [19]

Bonini et al.

[11] Patent Number: 4,533,098
[45] Date of Patent: Aug. 6, 1985

[54] THRUST REVERSER ATTACHMENT

[75] Inventors: Bruno Bonini; Raymond G. Cook; Carl F. Holdren, all of Cincinnati, Ohio; Everett A. Johnston, Baldwin, Md.

[73] Assignee: General Electric Company, Cincinnati, Ohio

[21] Appl. No.: 505,586

[22] Filed: Jun. 20, 1983

[51] Int. Cl.³ .................. B64D 33/04; B64C 1/00
[52] U.S. Cl. .................. 244/110 B; 244/117 R; 244/131; 244/213; 428/116; 403/79; 60/226.2; 52/787; 52/309.2
[58] Field of Search .............. 244/213, 215, 53 R, 244/110 B, 131, 132, 133, 117 R, 119, 23 D, 113; 52/787, 309.2; 428/116, 117, 118, 73, 134, 137, 138; 403/79, 119; 114/93, 90, 91; 441/74; 239/265.19, 265.31; 60/226.2, 230

[56] References Cited

U.S. PATENT DOCUMENTS

| | | | |
|---|---|---|---|
| 1,704,713 | 3/1929 | Stalb, Jr. ...................... | 244/131 |
| 1,741,366 | 12/1929 | Hurxthal ...................... | 52/787 |
| 2,791,089 | 5/1957 | Dimmock ...................... | 60/35.55 |
| 2,970,429 | 2/1961 | Dreifke ...................... | 60/35.6 |
| 3,153,321 | 10/1964 | Spears, Jr. ...................... | 60/35.54 |
| 3,252,493 | 5/1966 | Smith ...................... | 52/787 |
| 3,262,268 | 6/1965 | Beavers ...................... | 60/35.54 |
| 3,262,270 | 7/1966 | Beavers ...................... | 60/35.54 |
| 3,290,886 | 12/1966 | Monaghan ...................... | 60/226.2 |
| 3,500,645 | 3/1970 | Horn ...................... | 60/226.2 |
| 4,216,923 | 8/1980 | Harris ...................... | 244/110 B |
| 4,278,220 | 7/1981 | Johnston et al. ...................... | 244/110 B |
| 4,391,409 | 7/1983 | Scholz ...................... | 60/226.2 |
| 4,407,120 | 10/1983 | Timms ...................... | 60/226.2 |

FOREIGN PATENT DOCUMENTS 2337258  7/1977  France .

Primary Examiner—Galen L. Barefoot
Attorney, Agent, or Firm—Gregory A. Welte; Derek P. Lawrence

[57] ABSTRACT

An invention is disclosed for the attachment of a yoke to a laminated material composed of a medial matrix laminated between first and second skins. Two elongated parallel brackets are attached to the laminated material, the brackets each having a first segment fastened to the first skin, a second segment fastened to a first region of the second skin, and a third segment fastened to a second region of the second skin. The first and second regions are separated by a cavity in the second skin. The yoke is positioned in the cavity and fastened to the two brackets to provide a thrust point approximately coplanar with the second skin. The invention can be used to attach an actuator rod at the thrust point when the laminated material is that used in a cowling associated with a thrust reverser in a gas turbine aircraft engine.

6 Claims, 8 Drawing Figures

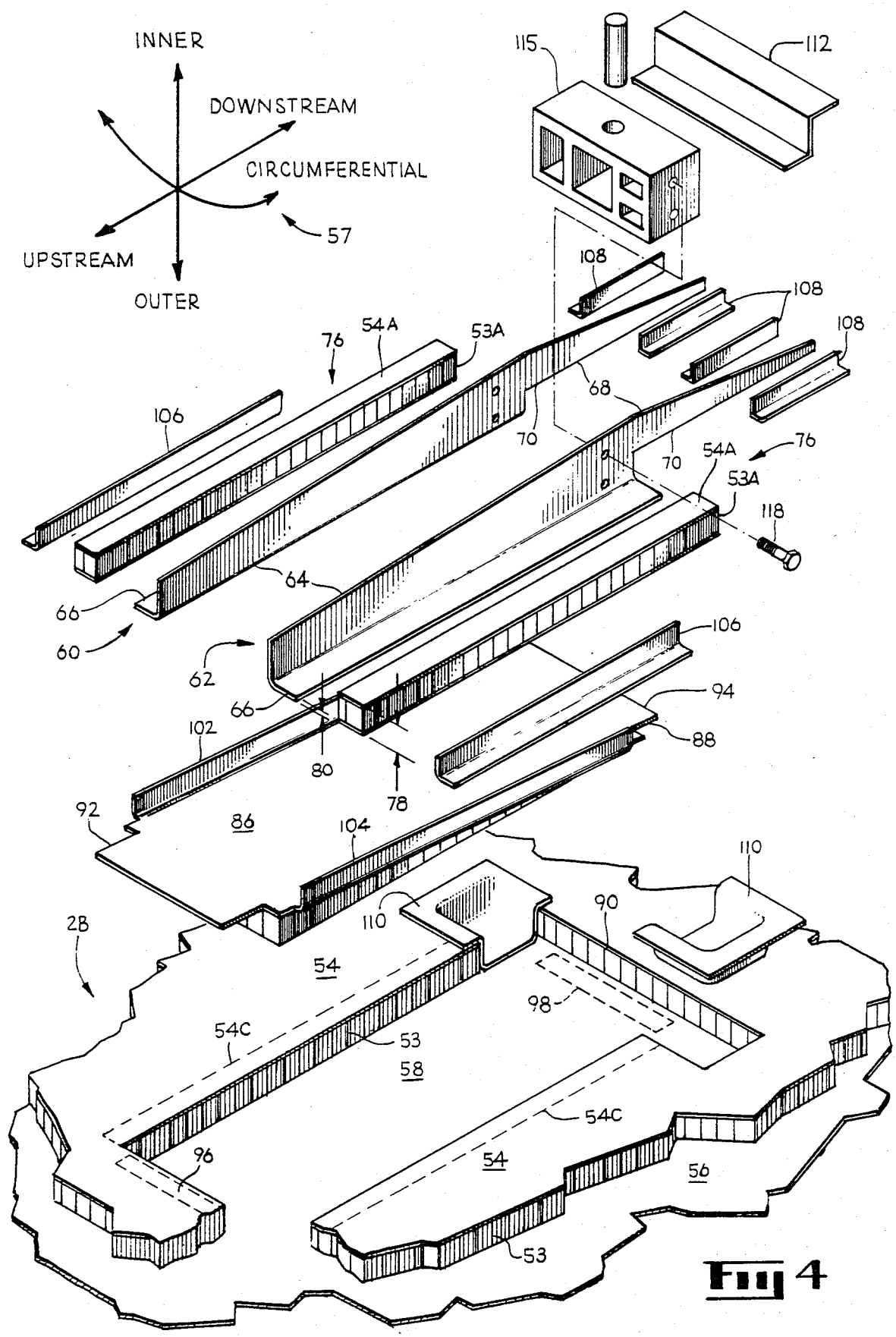

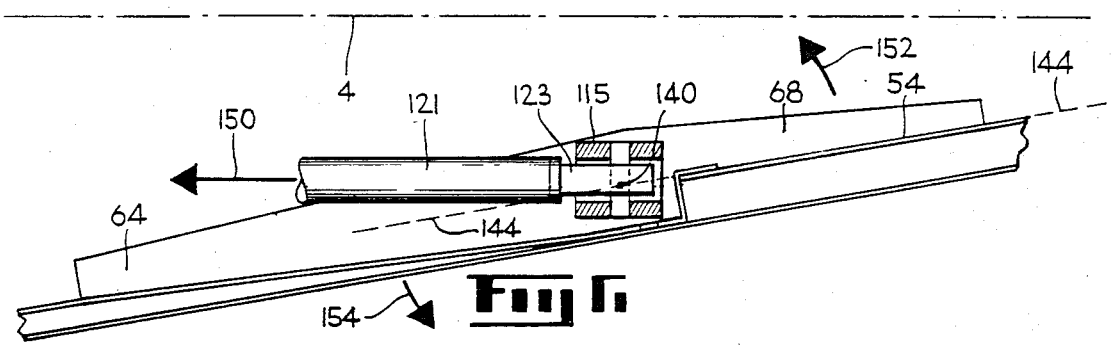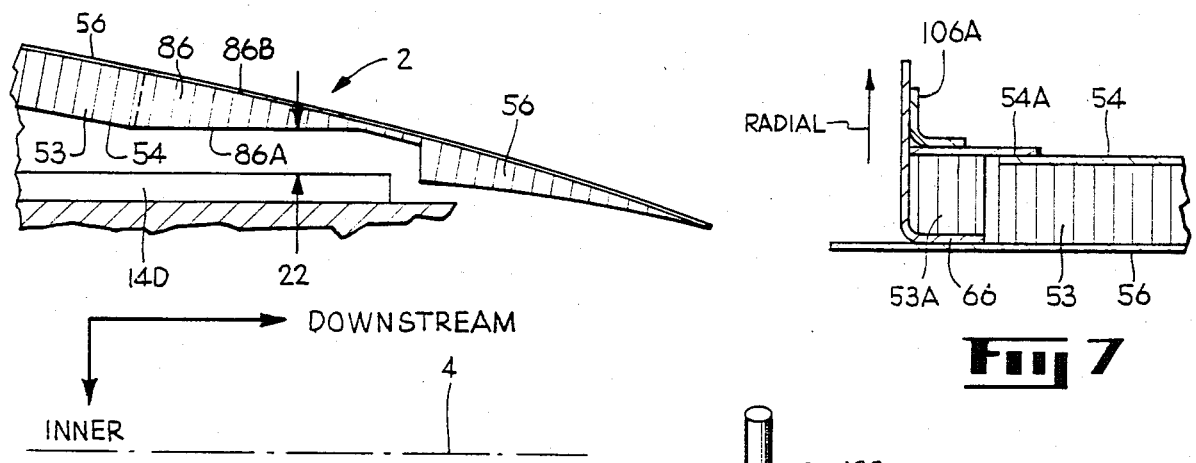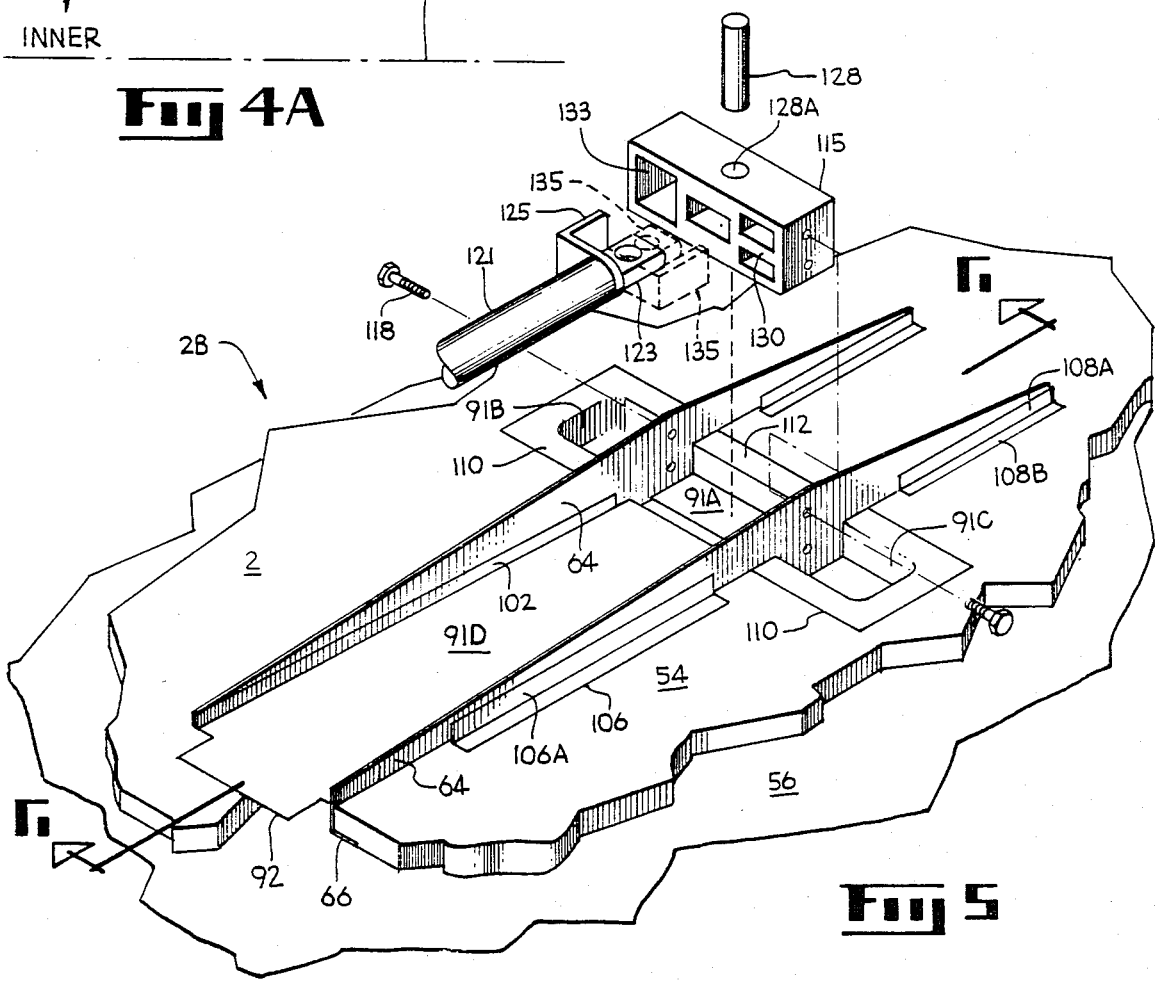

THRUST REVERSER ATTACHMENT

The invention relates to members for attaching a yoke to a laminated material and, more particularly, to such members which are attached to a laminated aircraft cowling and used to transmit forces from the yoke to the cowling for movement of the cowling.

BACKGROUND OF THE INVENTION

Gas tubrine aircraft engines are generally adapted to provide bi-directional thrust: rearward thrust for propulsion and forward thrust for braking.

FIGS. 1 and 3 (FIG. 3 being a partial side view of FIG. 1) schematically illustrate an engine assembly 1 used for generation of braking thrust. An annular cowling 2 and a nacelle 6 surround an engine, the fan 2A of which only is exposed. The annular cowling 2 can be translated generally parallel with the engine axis 4 to thereby open a passage 5 between the cowling 2 and the engine nacelle 6. Simultaneously, blocker doors 7 (not shown in FIG. 1) are rotated into the path of the rearward flowing propulsion gases 7A in FIG. 3 to divert these gases into the forward direction as jets 8 in FIGS. 1 and 3 to provide braking thrust for the aircraft.

The forces necessary to achieve translation of the cowl 2 are generally applied by threaded rod-and-ballscrew assemblies (termed actuator rods) 10A-C in FIG. 1 and 10C in FIGS. 2 and 3 (which are a schematic cross-sectional view of FIG. 1 taken along the lines 2—2). The actuator rods are aligned generally parallel with the engine's axis 4. There are similar actuator rods on the side of the engine facing away from the reader in FIG. 1 to provide balanced forces to the cowl 2 but which are not shown. The actuator rods are attached to respective brackets, only one of which is shown in FIG. 1, and that one is designated by the numeral 12, and if fastened to the cowling 2.

The demands placed upon the brackets 12 are rigorous. First, the brackets are commonly required to withstand forces of 6500 lb. each which are applied by the actuator rods. A significant problem is encountered in transmitting such forces to the cowling 2 when the cowling 2 is contructed of a honeycomb material sandwiched between graphite-epoxy skins, partly because the strength of the adhesion of the skin to the honeycomb material is generally much less than the strength of the skin itself. That is, if the bracket is attached to one skin, the force transmitted by the bracket can break the adhesive bond between the skin and the honeycomb.

Second, a clearance problem restricts the amount of space available to house the brackets 12. As shown in FIG. 2, the cowling 2 has inner and outer parts 14A and 14B. As stated above, this cowling 2 slides left- and rightward as shown by arrows 15C. A fixed, nonmoving structure 14D is present between the inner and outer parts 14A and 14B, and the distance or clearance 22 can be quite small, of the order of 0.10 inches (about 2.5 mm). The brackets 12 must allow this clearance 22 during translation of the cowling 2 in order to avoid damage.

Further, the cowling 2 is generally the shape of a truncated cone: the downstream portion 26 is of smaller diameter than the upstream portion 28. Thus, since the actuator rods such as 10C are generally parallel with the engine axis 14, the clearance afforded them becomes progressively less as they extend downstream. This is shown in FIG. 2, wherein a side view of the cowling 2 shows that the clearance 30 between the fixed member 14D and the cowling 2 diminishes in the downstream regions of the actuator rod 10C. The brackets 12 are frequently located in a downstream region 30A having low clearance.

Third, the movement of the cowling 2 with respect to the nacelle 6 occurs over a short time interval: about 2 seconds. Thus, a high impulse load, as well as a high absolute load, must be borne by the brackets 12.

OBJECTS OF THE INVENTION

It is an object of the present invention to provide a new and improved attachment member for applying forces to a laminated body.

It is a further object of the present invention to provide a new and improved attachment member for applying translating forces to an aircraft engine cowling utilized in association with the engine's thrust reverser mechanism.

SUMMARY OF THE INVENTION

In one form of the invention, a yoke is supported upon a laminated material comprising a medial maxtrix laminated between first and second skins. Two parallel elongated brackets each have a first segment fastened to the first skin, a second segment fastened to one region of the second skin, and a third segment fastened to a second region of the second skin. A cavity exists between the first and second regions and the yoke is fastened between the brackets in the cavity. The yoke thus positioned provides a thrust point which is coplanar with the second skin. The thrust point receives forces from an actuating rod.

BRIEF DESCRIPTION OF THE DRAWING

FIG. 2 depicts a cross-sectional view of the nacelle of FIG. 1.

FIG. 4 depicts an exploded view of one form of the present invention.

FIG. 4A depicts a cross-sectional view of the wedge 86 of FIG. 4 in assembled form.

FIG. 5 depicts one form of the present invention in assembled form.

FIG. 6 depicts part of the invention shown in FIG. 5 to show a moment created by forces applied.

FIG. 7 depicts details concerning the attachment of a plate to a honeycomb cowling.

DETAILED DESCRIPTION OF THE DRAWING

Figure 1:
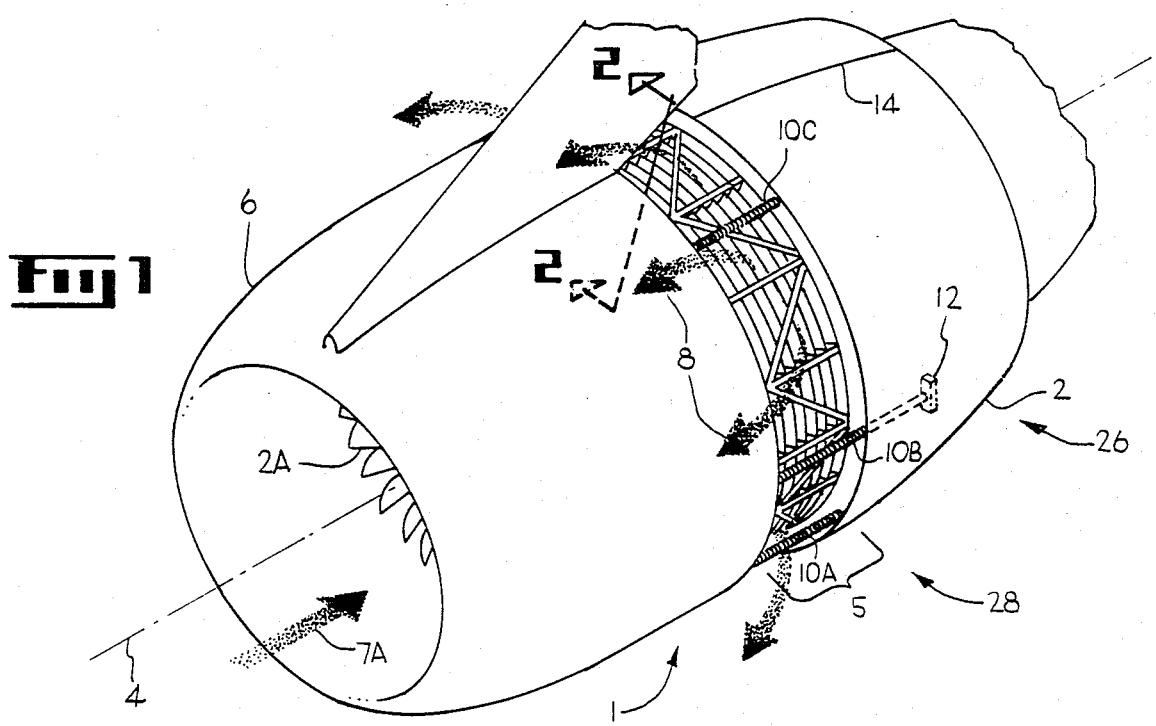
Figure 2:
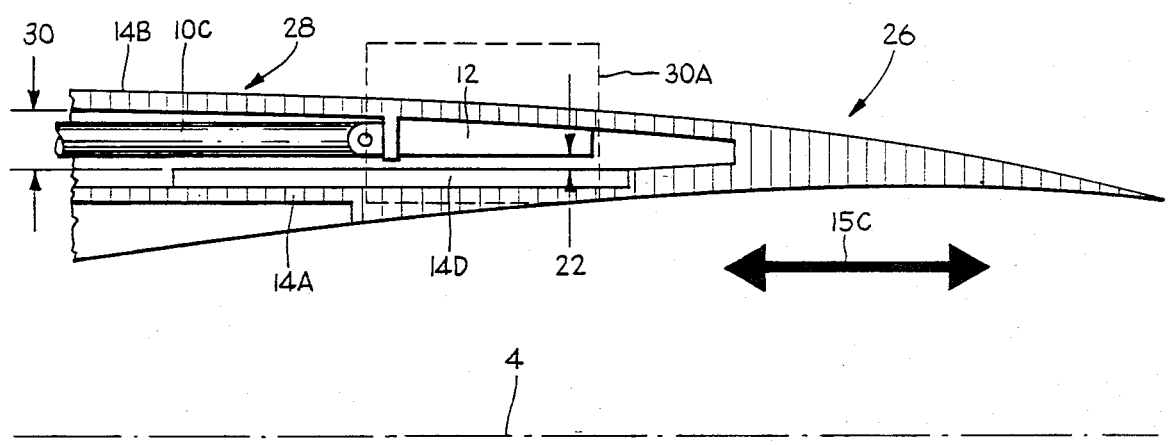
FIG. 2 depicts an aircraft engine nacelle and part of a thrust reverser.
Figure 3:
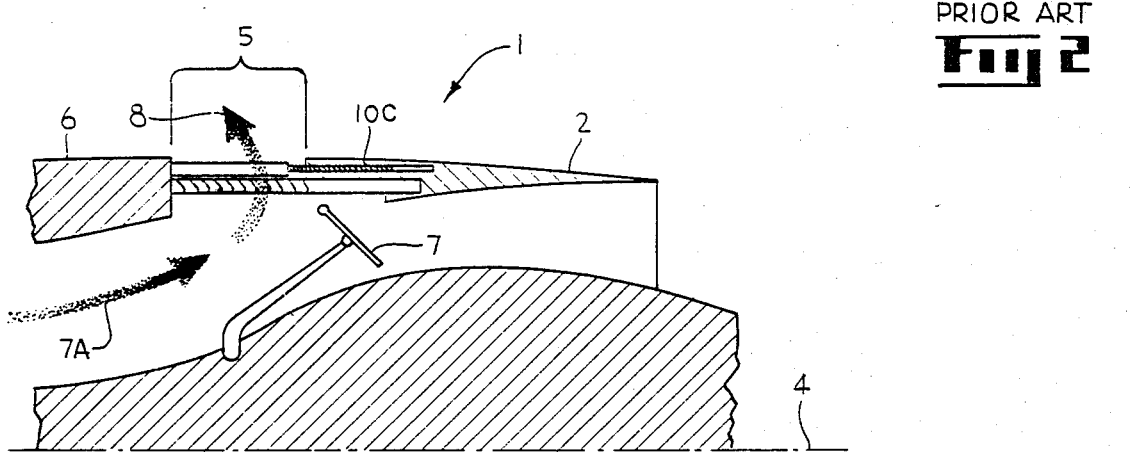
FIG. 3 depicts a cross-sectional view of part of FIG. 1, showing blocker doors of the thrust reverser.

FIG. 4 shows an attachment assembly which can be utilized as the bracket 12 to attach the actuator rods 10A-C in FIGS. 1-3 to the cowling 2. A portion 2B of this cowling 2 bearing the bracket 12, and viewed from the inside, is shown in FIGS. 4 and 5, FIG. 4 being an exploded view of FIG. 5. The cowling 2 in FIG. 4 includes a medial matrix 53, which can consist of a honeycomb structure manufactured of a polyamide such as that sold under the trade name NOMEX and known in the art. The medial matrix 53 is sandwiched between inner and outer skins 54 and 56 which can comprise composites constructed of graphite fibers embedded in an epoxy substrate, again, as known in the art. As known in the art, the medial matrix 53 generally possesses less tensile strength than the outer skins 54 and 56. A reference system 57 designates directions defined as inner and outer, as well as upstream, downstream, and circumferential, and used in the following discussion. The inner and outer directions are radial directions in respect of the axis 4 in FIG. 1.

In FIG. 4, a well 58 is cut into the cowling 2 and part of the medial matrix 53 and part of the inner skin 54 (parts not shown) are removed from the well 58, leaving the outer skin 56 intact at the bottom of the well 58. Two parallel elongated plates 60 and 62 having upstream web portions 64 and foot portions 66 are positioned such that the foot portions 66 lie against the inner surface of the outer skin 56. The plates 60 and 62 have downstream web portions 68 devoid of foot portions analogous to foot portions 66. Accordingly, the downstream web portions 68 do not penetrate inner skin 54 but rest atop the inner skin 54 along edges 70. It is noted that the foot portions 66 of the plates 60 and 62 are generally circumferentially directed along the inner surface of the outer skin 56 and that the upstream and downstream web portions 64 and 68 are generally radially directed.

The upstream web portions 64 are buttressed by the replacement of part 54A of the inner skin 54 and part 53A of the medial matrix 53 taking the form of blocks 76. These blocks 76 are reduced in thickness (dimension 78) to accommodate the thickness (dimension 80) of the foot portions 66 so that the inner surface of blocks 76 lie flush with the surrounding inner skin 54 of the cowling when the foot portions 66 are positioned. The replacement part 54A of the inner skin 54 overlaps the intact inner skin 54 in the dashed region 54C as shown in FIG. 4 but not FIG. 7 for clarity. The web portions 64 in FIG. 4 are further buttressed by a wedge 86 of medial matrix material positioned between them and having a thin portion 88 which stops short of the end 90 of the well 58, thus providing, together with the plates 64 as shown in FIG. 5, a central cavity 91A and two flanking cavities 91B and C in the well 58. A wedger shape is chosen so that the inner surface 86A of the wedge 86 in FIG. 4A can lie generally parallel to the engine axis 4 (the axis 4 being shown in FIGS. 1, 2, 3, and 4A), while the outer surface 86B can lie generally parallel to the outer skin 56, which is generally conical as stated in connection with FIG. 2A. That is, a channel 91D in FIG. 5 is provided between the plates 60 and 62.

In addition, the wedge 86 functions to maintain a fixed distance between the elongated plates 60 and 62. The wedge 86, in this connection, acts as a spacer. This assists the cowling 2 in resisting bending which may occur in the region of the well 58 because of the removal of the medial matrix material. The wedge 86, in replacing some of this medial matrix material, strengthens the cowling 2 against bending in the region of the well 58 by providing circumferentially directed forces against the plates 60 and 62.

The wedge 86 in FIG. 4 is covered with a layer of a aramid cloth, such as that sold under the trade name Kevlar, having respective upstream and downstream protruding tongues 92 and 94 which overlie respectively the inner skin 54 at the dotted region 96 and the inner surface of the outer skin 56 at the dotted region 98. The Kevlar cloth further contains two radially extending wing portions 102 and 104 pressed against the upstream web portions 64 in FIGS. 4 and 5 to provide shear plates for transmitting the actuation forces later to be described from the plates 64 to the cowl 2. L-shaped shear clips 106 are fastened between the upstream web portions 64 and the inner skin portion 54A. Additional L-shaped shear clips 108 are fastened between the downstream web portions 68 and the inner skin 54. These shear clips 106 and 108 are constructed of graphite/epoxy composites, as are the plates 60 and 62.

Flanking cavities 91B-C are lined with a surface of Kevlar cloth assuming the shapes shown as 110. The central cavity 91A is lined with the tongue 94 and a Kevlar cloth downstream portion 112. Any members described above which are attached to the medial matrix are attached to the matrix by use of a structural foam filler known in the art. All members attached to components other than medial matrix 53, such as the shear clips 108 which are attached to the downstream web portions 68, are attached by adhesives known in the art, such as epoxy adhesive resins such as FM300 manufactured by American Cyanamid Co. The particular means of attachment used are not part of the present invention and are known in the art.

A yoke 115 is fastened between the webs 64 by blindbolts 118 (only one bolt is shown). The flanking cavities 91B and C allow access to the boltheads. An actuator rod 121 having a tang portion 125 and a threading alignment prong 123 is fastened to the yoke 115 by a clevis pin 128. The pin is actually inserted from the outer side of the cowling 2 and held in place by a plate (not shown) fastened to the cowling 2. Thus, hole 128A does not actually exist, but is shown for explanatory purposes. A stop 130 contained in the yoke 115 prevents the tang portion 125 from being inserted other than into its alignment channel 133. The tang portion 125 is utilized because the actuator rod 121 is fixedly attached to a ball nut (not shown) which is driven by a threaded shaft (not shown). The relative rotational position of the nut with respect to the shaft determines the axial position of the cowling 2 to the nacelle 6. If the tang 125 were not inserted into the alignment slot 133 but were inserted 180° opposite the slot 133, the prong 123 and hence the cowling 2 would be shifted to a position such as that shown by phantom outline 135 which may be a different axial position (i.e., downstream along the axis 4 in FIG. 1) than that occupied by the other tangs (not shown) of the other actuator rods 10A-10C in FIG. 1. It is important that this be avoided and that all the tangs of all the actuator rods 10A-C occupy known, and preferably indentical, axial position so that the cowling 2 is not skewed. The tank 125 also prevents rotation of the actuator rod 121 by the rotation of the threaded shaft. The actuator rod 121 must translate with rotation of the threaded shaft.

The components described above in connection with FIG. 4 are shown in a more assembled form in FIG. 5.

FIG. 6 is a side view taken along lines 6—6 in FIG. 5. It is noted that the point at which the thrust is applied from the actuator rod 121 to the yoke 115, herein termed a thrust point 140, is substantially coplanar with the inner skin 54, as shown by the intersection of the thrust point 140 with dashed line 144. Dashed line 144 represents an extension of the inner skin 54 over the central cavity 91A. Thus, with the thrust point 140 being located coplanar with the inner skin 54, clearance between the cowling 2 and the fixed structure 14D in FIG. 2 is maintained and further, the forces applied to the plates 60 and 62 in FIG. 4 by the actuator rods 10A-C in FIG. 1 are transmitted to the cowling 2 as substantially shear forces through the shear plates 106 and 108, through the various points of attachment of the plates 60 and 62, and through the foot portions 66 to the cowling 2.

However, as shown in FIG. 6, application of a force from the actuator rod 121 in the direction designated by arrow 150 to the thrust point 140 results in a moment of the webs 64 and 68 about the thrust point 140 as shown by arrows 152 and 154. This moment is reacted by shear forces in the shear clips along their radially directed subportions 106A and 108A in FIG. 5 and in the wings 102 and 104 in FIG. 4. However, tensile forces are also imposed on the shear clips along their foot portions 108B, as well as in the foot portions 66 of the plates 60, 62, in wings 102 and 104 and in shear clips 106.

Further, as shown in FIG. 7, as the plate 60 in FIG. 4 is pulled in the radial direction by the radial component of the force of the rod 121 in FIG. 6, the foot 66 is restrained by the core 53A above it which is, in turn, restrained by its attachment to the medial matrix 53.

An invention has been described in which a bracket on a laminated aircraft engine cowling receives an actuating force from an actuator rod to effect translation of the cowling. The invention directs the actuating force to a thrust point which is substantially coplanar with the inner surface of the cowling and distributes this actuating force as primarily shear forces along the cowling's inner and outer skins and secondarily as tensile forces to these skins, resulting, secondarily, in a moment of the bracket about the thrust point.

In another embodiment of the present invention, it may be desired to design the bolts 118 in FIGS. 4 and 5 as having sufficient strength that bolt failure is never expected. In such a case, access to the bolts 118 for maintenance is not necessary and the flanking cavities 91B and 91C can be filled in with replacements medial matrix material and inner skin material.

Numerous substitutions and modifications of the present invention can be undertaken without departing from the true spirit and scope of the invention as defined in the following claims.

What is desired to be secured by Letters Patent of the U.S. is the following.

We claim:

1. In a laminated material having a medial matrix laminated between first and second skins, an apparatus for receiving a force and transmitting the force to the laminated material, comprising:
   (a) two elongated substantially parallel brackets each having
      (i) a first segment fastened to the first skin,
      (ii) a second segment fastened to a first region of the second skin, and
      (iii) a third segment fastened to a second region of the second skin, the first and second regions being separated by a cavity in the second skin; and
   (b) a yoke fastened to the two elongated brackets and located in the cavity for receiving the force at a thrust point positioned approximately coplanar with the second skin.

2. Apparatus for transmitting a force to a laminated material which has a medial matrix laminated between first and second skins, both skins having inner and outer surfaces, and which material is subject to bending forces, comprising:
   (a) two substantially parallel supports which are both
      (i) partially submerged along parts of their lengths in the medial matrix and fastened to the inner surface of the first skin in the submerged region,
      (ii) fastened to the second skin in both the first region and in a third region which is not submerged in the medial matrix;
   (b) a spacer fastened between the supports of (a) for increasing the resistance of the material to bending in the region between the supports.

3. Apparatus for transmitting forces to a laminated material, which material includes a medial matrix having a relatively low tensile strength laminated between two skins, both skins having inner and outer sides and both having relatively high tensile strengths, the apparatus comprising:
   (a) two substantially parallel elongated supports partially submerged into the medial matrix and
      (i) fastened to the inner side of the first skin,
      (ii) fastened to the inner side of the second skin;
   (b) a yoke fastened between the elongated supports and providing a thrust point coplanar with the second outer skin.

4. Apparatus for attaching an actuator rod to an annular cowling surrounding a gas turbine engine, the annular cowling having an upstream portion and a downstream portion of lesser diameter than the upstream portion, the annular cowling having inner and outer skins with respective inner and outer surfaces, and the engine having an axis, comprising:
   (a) a pair of generally parallel, elongated brackets separated by a space and each bracket having a radially directed web portion and a circumferentially directed foot portion, the brackets having upstream and downstream portions, with
      (i) an upstream foot portion in each bracket being connected to the inner surface of the outer skin,
      (ii) an upstream web portion in each bracket being connected to the inner skin,
      (iii) a downstream web portion in each bracket being connected to the inner surface of the inner skin;
   (b) a yoke spanning the space between the brackets and connected to both brackets;
   (c) wedge means for supporting the brackets and positioned upstream of the yoke of (b), the wedge means being thinner in its downstream region for providing a channel for an actuator rod which contacts the yoke and which extends substantially parallel with the axis of the engine.

5. A method of moving an annular cowling having upstream and downstream regions and surrounding a gas turbine engine having an axis, the cowling having a medial matrix laminated between inner and outer skins, and the cowling having a downstream diameter lesser than an upstream diameter, comprising the following steps undertaken simultaneously:
   (a) applying an axially directed force to a thrust point located substantially coplanar with the inner skin of the cowling;
   (b) using elongated means extending upstream and downstream of the thrust point, transmitting the force to a first region, on the outer skin, upstream of the thrust point, and to a second region, on the inner skin, downstream of the thrust point, to
      (i) transmit the force to the cowling and
      (ii) generate a moment in the elongated means about the thrust point; and
   (c) counteracting the moment of (b) by
      (i) extending radially directed forces between the first region of (b) and the upstream portion of the elongated means and (ii) extending radially directed forces between the second region of (b) and the downstream portion of the elongated means.

6. A method of claim 5 in which the elongated means comprises two spaced-apart substantially parallel members and further comprising the following step undertaken simultaneously with those of claim 5:

providing, in response to the force, circumferentially directed forces between the parallel members for reducing bending of the cowling.

* * * * *